United States Patent
Krull

[11] Patent Number: 6,053,552
[45] Date of Patent: Apr. 25, 2000

[54] UNITARY EDGE SUPPORT FOR LID OPENING OF BULK TRAILER OR TRUCK BODY

[75] Inventor: Gregory James Krull, George, Iowa

[73] Assignee: Sudenga Industries, Inc., George, Iowa

[21] Appl. No.: 09/042,253

[22] Filed: Mar. 13, 1998

[51] Int. Cl.$^7$ ..................................................... B60P 3/22
[52] U.S. Cl. .............................. 296/32; 52/780; 296/15; 296/181
[58] Field of Search ................................ 296/15, 29, 30, 296/181, 183, 32, 36, 184; 52/770, 771, 780

[56] References Cited

U.S. PATENT DOCUMENTS

| | | | |
|---|---|---|---|
| 1,765,204 | 6/1930 | Card | 296/180 |
| 3,692,349 | 9/1972 | Ehrlich | 296/28 M |
| 4,018,480 | 4/1977 | Stone | 298/27 |
| 4,403,804 | 9/1983 | Mountz et al. | 296/183 |
| 4,678,225 | 7/1987 | Ritzl et al. | 296/181 |
| 4,840,127 | 6/1989 | Tomaka | 105/406.1 |
| 5,472,290 | 12/1995 | Hulls | 403/407.1 |

OTHER PUBLICATIONS

Sudenga Feed Bodies Aluminum "Big Boy Series", Oct. 1995.
Sudenga Feed Bodies Bulk Feed Trailer, Jan. 1996.
Sudenga Feed Bodies Aluminum "ST Series", Dec. 1997.
Sudenga Industries, Inc. Front–unload Bulk Feed Trailer.

*Primary Examiner*—D. Glenn Dayoan
*Assistant Examiner*—Paul Chenevert
*Attorney, Agent, or Firm*—Kinney & Lange P.A.

[57] ABSTRACT

An edge support extends longitudinally along the lid opening for a bulk body. The edge support includes a wall support, a rim above the wall support, and a receiving slot between the wall support and the rim for receiving the longitudinal extending edge of the bulk body wall. The edge support is unitarily and integrally formed of a single piece, such as an extrusion out of aluminum. The edge support is strong and low cost and facilitates manufacture of the bulk body.

14 Claims, 4 Drawing Sheets

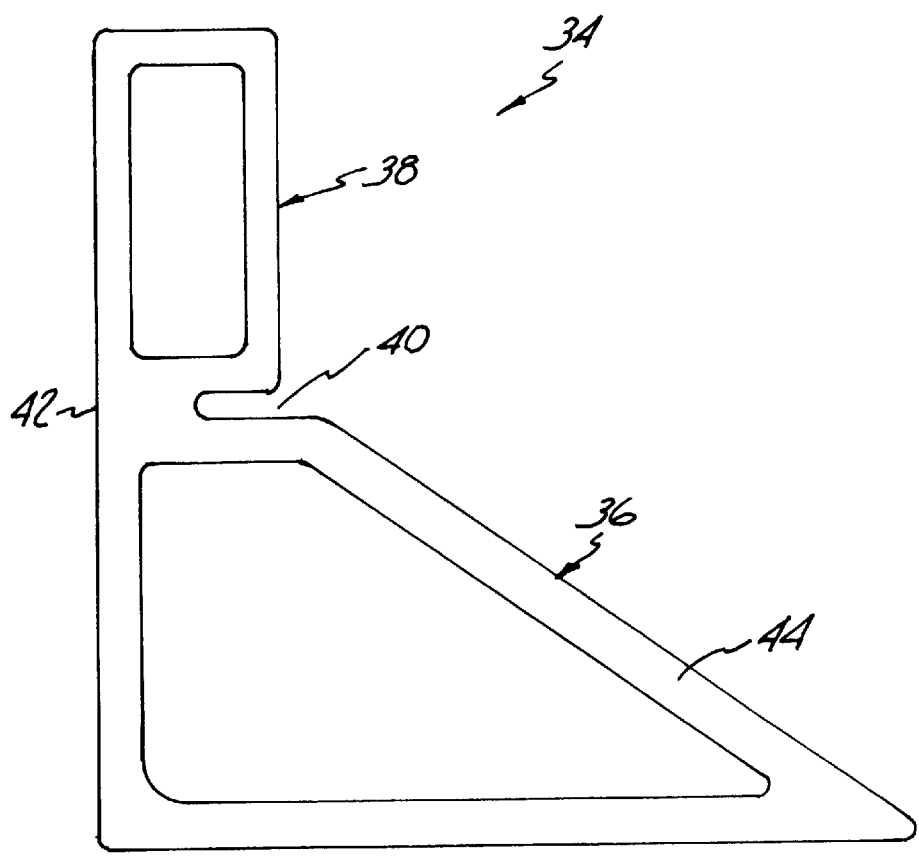

UNITARY EDGE SUPPORT FOR LID OPENING OF BULK TRAILER OR TRUCK BODY

CROSS-REFERENCE TO RELATED APPLICATION(S)

BACKGROUND OF THE INVENTION

The present invention relates to bulk product trailer bodies such as pulled by semi trucks on roadways for high capacity transport of bulk product. More particularly, the present invention relates to a new design of an edge support for the lid opening of a bulk trailer or truck body.

Bulk bodies, also called bulk feed bodies, are well known and widely used to transport a wide variety of bulk products. The trailer bodies are pulled by a truck cab, tractor or semi, such as an "18 wheel" configuration. Bulk bodies may also be mounted on a straight truck. For instance, bulk grain products such as livestock feed may be carried by the bulk body from a silo or other source to an appropriate discharge location. The bulk bodies typically range in length from 12 to 42 feet.

The bulk body includes one or more large enclosures having a lid opening in the top. A closable discharge opening may be included in the bottom of the enclosure. The enclosure is primarily made from sheet metal walls which may be welded together. The sheet metal walls may or may not be welded to a stronger frame structure. Manufacture of the bulk bodies should be made as simple as possible to reduce the cost of the bulk body. The bulk body should be lightweight to reduce transportation costs.

The bulk body should be easily cleaned, both on the inside and the outside, to provide a pleasing physical appearance. Easy cleaning of the bulk body is also important for sanitation purposes, particulary when handling feed or other products that may rot, decay or spoil due to bacteria.

The lid opening is inherently the weakest part of the bulk body, because the sheet metal walls do not extend across the lid opening. As the truck or semi-tractor bulk goes over bumps or undulations in the road, the bulk body is twisted. The twisting strain is transferred to and concentrated at the open edge of the lid opening. The stronger a lid opening is made, the more the bulk body is able to resist the strain of twisting during use.

The bulk body should be made to resist corrosion or wear over time, such that the initial strength and cleanliness of the bulk body is not lost.

BRIEF SUMMARY OF THE INVENTION

The present invention is an edge support for a bulk body, and a bulk body including the edge support. The edge support extends longitudinally along the lid opening. The edge support includes a wall support, a rim above the wall support, and a receiving slot between the wall support and the rim for receiving the longitudinal extending edge of the body wall. The edge support is unitarily and integrally formed of a single piece. The edge support is strong and low cost and facilitates manufacture of the body.

BRIEF DESCRIPTION OF THE DRAWINGS

FIG. 4 shows a cross-sectional view of the edge support of the present invention.

While the above-identified drawing figures set forth a preferred embodiment, other embodiments of the present invention are also contemplated, some of which are noted in the discussion. In all cases, this disclosure presents the illustrated embodiment of the present invention by way of representation and not limitation. Numerous other minor modifications and embodiments can be devised by those skilled in the art which fall within the scope and spirit of the principles of this invention.

DETAILED DESCRIPTION

Figure 1:
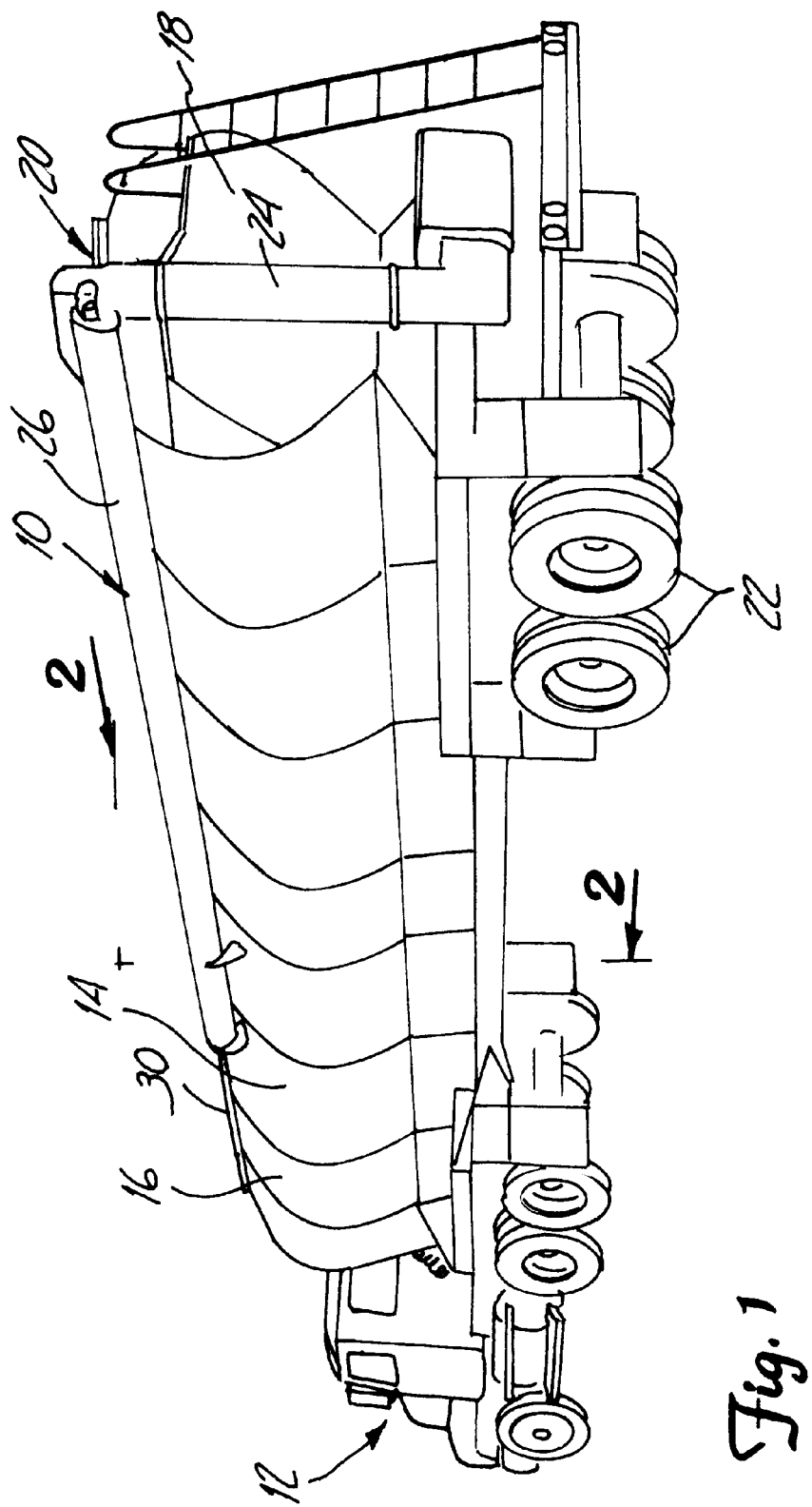
FIG. 1 is perspective view of a trailer body being pulled by a truck tractor.

FIG. 1 shows a trailer 10 being pulled by a truck tractor 12. The trailer 10 has a trailer body 14 with peripheral side walls 16 and end walls 18 defining an enclosure 20. The bulk 10 also includes wheels 22 so the trailer 10 can be pulled in its longitudinal direction by the tractor 12. The enclosure 20 may be a single compartment that extends longitudinally for the entire length of the trailer 10. Alternatively, interior divider walls (not shown) may extend vertically to separate the enclosure 20 into various compartments. The interior divider walls may include "heads" or walls transverse to the longitudinal axis, as well as longitudinally running walls. The side walls 16, end walls 18 and any interior walls may be formed out of sheet metal and welded together. Preferably sheet metal aluminum is used to minimize trailer weight. An auger system including a vertical auger 24 and a discharge auger 26 may be provided to facilitate and/or unloading of the enclosure 20.

Figure 2:
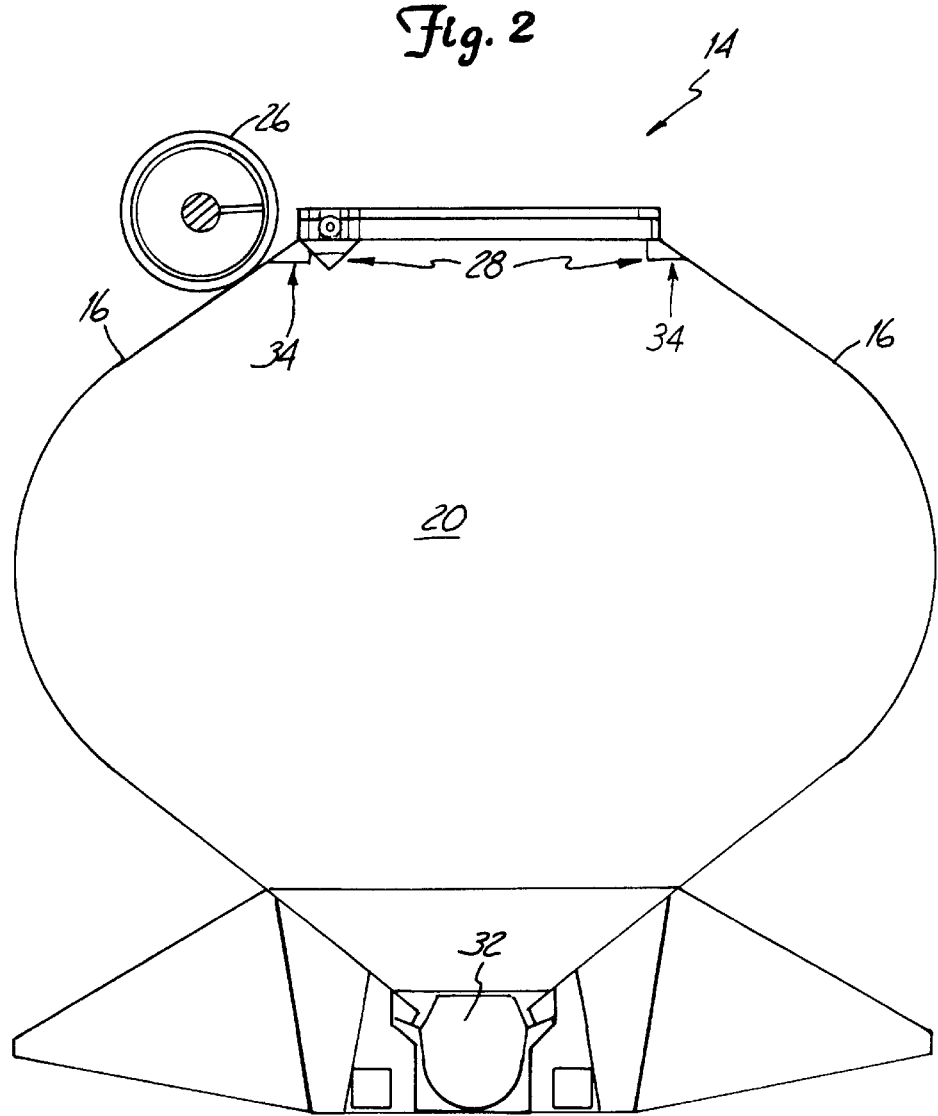
FIG. 2 is cross-sectional view of the trailer body.

As better shown in FIG. 2, a lid opening 28 is located at the top of the enclosure 20. The lid opening 28 may only run for a portion of the length of the bulk body 14, or more preferably extends longitudinally along the entire length of the trailer body 14. The lid opening 28 allows the enclosure 20 to be filled from the top.

A lid 30 may be included to cover the lid opening 28. The lid 30 may be one piece, or may have two or more separately moveable lid pieces such that each lid piece extends over only a portion of the enclosure 20. The lid 30 may be formed of metal such as aluminum. Alternatively, the lid 30 may be provided by a tarp such as a SHUR-LOK roll tarp. If metal lids are used, a hydraulic, electric or pneumatic power source may be included to assist in retracting the lid 30 upon command.

A floor auger 32 with gates may be included at the bottom of the enclosure 20. The floor chute 32 is ordinarily closed, but can be opened upon command to allow the bulk product carried to be dumped in a desired location.

Figure 3:
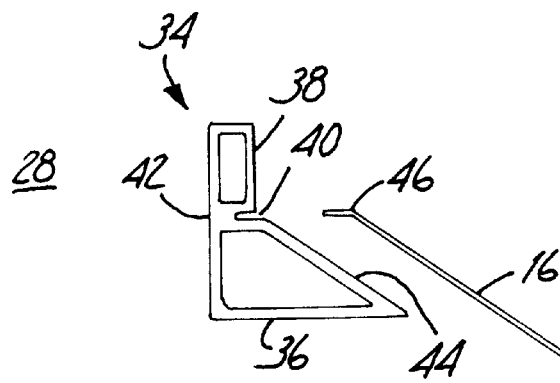
FIG. 3 shows an enlarged cross-sectional view of the lid opening portion of FIG. 2.

As better shown in FIGS. 3 and 4, the longitudinally running edge of the lid opening 28 is defined by an edge support 34. The edge support 34 runs longitudinally for the length of the lid opening 28, which may be the longitudinal length of the bulk body 14. While the edge support 34 may be used on only one side of the lid opening 28, preferably two edge supports 34 are used, each running longitudinally on opposing sides of the lid opening 28.

The edge support 34 is formed integrally or unitarily from a single piece of metal, such as by an extrusion. The edge support 34 is secured to the peripheral side wall 16. The edge support 34 is preferably formed of aluminum, which is easily extruded and provides a lightweight strong structure.

The edge support 34 includes a wall support 36 and a rim 38 separated by a wall receiving slot 40 between the wall support 36 and the rim 38. The edge support 34 is preferably about 4½ inches tall, and is preferably about 4½ inches wide at the base of the wall support 36. Both the rim 38 and the wall support 36 are preferably hollow, minimizing the weight of the edge support 34.

The rim 38 and the wall support 36 are aligned with each other to provide a single flat side surface 42 facing inwardly toward the lid opening 28. That is, the inside surface of the wall support 36 and the inside surface of the rim 38 each extend smoothly together in a common plane. Because the edge support 34 is unitarily formed, there are no fasteners extending through the side surface 42 and no creases or seams in the side surface 42. The side surface 42 provides an aesthetically pleasing edge which is easily maintained in a clean condition.

The wall support 36 has an angled section 44 that is used for rigid support of the peripheral side wall 16. The angle should be selected based on the desired profile for the side wall 16. In the preferred design, the angled section 44 extends downward at an angle of 35° from horizontal. The angled section 44 extends for a sufficient distance along the peripheral wall 16 to lend significant rigidity and strength to the side wall 16, so the side wall 16 can withstand the twisting stresses to which it will be subjected. In the preferred design, the angled section 44 extends for about 4 inches, i.e., the wall support 36 extends transversely along the peripheral wall 16 for a distance of about 4 inches.

The lid opening trim or rim 38 is located on top of the wall support 36. The rim 38 is sized appropriately for the lid opening 28, providing the strength necessary to receive and support the lid 30. For instance, the preferred rim 38 is about 2 inches high and 1 inch wide. Because the edge support 34 is integrally formed as a single piece, there is no need for further attachment between the rim 38 and the wall support 36. The wall support 36 lends added strength to the rim 38, and the rim 38 lends added strength to the wall support 36.

The wall receiving slot 40 receives the longitudinally extending edge of the sheet material for the side wall 16. The receiving slot 40 may have a width which is slightly larger than the thickness of the sheet material for the side wall 16, such as about 0.15 inches.

During manufacture of the bulk body 14, one or more "wrapper sheets" are used for the side wall 16. A bend 46 (FIG. 3) is formed near the longitudinal edge of the wrapper sheets such as with a press brake, and then the wrapper sheets are placed in or tucked into the receiving slot 40. Because of the receiving slot 40, the edge support 34 self aligns to the edge of the each of the wrapper sheets, and alignment problems are minimized. The wrapper sheets are secured to the edge support 34 and in the receiving slot 40 as known in the art, such as through welding. The wrapper sheets are secured to the edge support 34 at the intersection of the angled section 44 and the base of the wall support 36. The aligned wrapper sheets are then secured to each other such as through butt welding to form the side wall 16.

The receiving slot 40 should have a depth sufficient to receive the edge of the sheet material without allowing any portion of the edge to pull out of the receiving slot 40 and go unsupported. However, the depth of the receiving slot 40 should not be so great as to provide a point of weakness or possible bending between the wall support 36 and the rim 38. In the preferred embodiment, the depth of the receiving slot 40 is less than half the width of the rim 38. For instance, the receiving slot 40 preferably has a depth of about 0.45 inches. With a rim 38 which is 1 inch wide, this provides a thickness of 0.55 inches for the connection between the rim 38 and the wall support 36, which is adequately strong to avoid any bending of the edge support 34 between the wall support 36 and the rim 38.

The receiving slot 40 is preferably disposed at an angle relative to the angled section 44 of the wall support 36. For instance, if the angled section 44 of the wall support 36 extends at an angle of 35° to horizontal, the receiving slot 40 may be horizontal. By having the receiving slot 40 at an angle relative to the angled section 44 of the wall support 36, the side wall 16 includes a bend 46 immediately adjacent its longitudinal edge. This bend 46 in the side wall 16 further helps to add strength and rigidity to the side wall 16.

Figure 5:
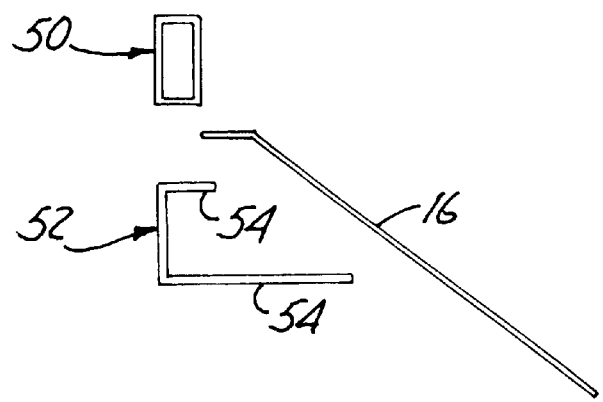
FIG. 5 shows an enlarged, exploded cross-sectional view of a lid opening portion according to the prior art.

FIG. 5 shows a view similar to FIG. 3 but showing a prior art structure for the lid opening portion. The prior art structure included a rim 50 which was a separate component from a wall support 52. The wall support 52 did not include an angled section, but rather just included two horizontal supports 54 for the side wall 16.

The edge support 34 of the present invention makes manufacture of the bulk body 14 easier for several reasons. First, there are fewer parts to fabricate and maintain in stock. Second, the edge support 34 of the present invention is self aligning to the edge of the wrapper sheets of the side wall 16. With the prior art structure, the worker had to align the wall support 52 relative to the edge of the wrapper sheets and hold the wall support 36 in alignment during attachment. Third, there is no separate step of attachment of the lid opening portion 50 to the wall support 52/side wall 16. Significantly less welding time is required to assemble the bulk body 14.

The edge support 34 of the present invention is light in weight, particularly if extruded from aluminum. The edge support 34 is easily cleaned and provides a pleasing physical appearance without any visible weld discoloration or seams or creases on the inside surface. The edge support 34 provides added strength because the wall support 36 and the rim 38 each strengthen each other more intimately than with the prior art welded structure.

Although the present invention has been described with reference to preferred embodiments, workers skilled in the art will recognize that changes may be made in form and detail without departing from the spirit and scope of the invention.

What is claimed is:

1. A bulk body comprising:

a peripheral wall defining an enclosure with a lid opening which extends longitudinally, the peripheral wall having an inside and an outside, the peripheral wall being formed of sheet material and terminating in a longitudinally extending edge to define the lid opening;

edge support secured to the peripheral wall and extending longitudinally, the edge support comprising:

a wall support which contacts the inside of the peripheral wall along the longitudinally extending edge and supports the peripheral wall;

a rim extending from the wall support, the rim having a width;

a receiving slot running longitudinally and defined on one side by the wall support and on an opposing side by the rim, the receiving slot having a thickness extending from the rim to the wall support, the thickness of the receiving slot corresponding generally to the thickness of the sheet material, the receiving slot having a depth measured transverse to the thickness, which is less than the width of the rim, the receiving slot receiving the longitudinally extending edge of the peripheral wall;

wherein the edge support is unitarily and integrally formed of a single piece.

2. The bulk body of claim 1, wherein the edge support is an extrusion.

3. The bulk body of claim 2, wherein the edge support is formed of aluminum.

4. The bulk body of claim 2, wherein the rim is hollow and the wall support is hollow.

5. The bulk body of claim 1, wherein the wall support and the rim each have an inside surface, which inside surfaces extend smoothly together in a common plane.

6. The bulk body of claim 1, comprising two of said edge supports on opposing sides of the lid opening.

7. The bulk body of claim 1, wherein the depth of the receiving slot is less than half the width of the rim.

8. The bulk body of claim 1, further comprising a lid covering the lid opening.

9. The bulk body of claim 1, further comprising:
end walls joined to the peripheral wall to define a longitudinal extent of the enclosure.

10. The bulk body of claim 1, further comprising:
a plurality of wheels rotationally mounted relative to the peripheral wall.

11. A method of forming a bulk body, comprising:
unitarily and integrally forming an edge support of a single piece, the edge support comprising:
a wall support;
a rim extending from the wall support, the rim having a width;
a receiving slot running longitudinally and defined on one side by the wall support and on an opposing side by the rim, the receiving slot having a thickness extending from the rim to the wall support, the receiving slot having a depth measured transverse to the thickness, which is less than the width of the rim;
forming a peripheral wall of sheet material such that the peripheral wall defines an enclosure with a lid opening which extends longitudinally, the peripheral wall having an inside and an outside, the peripheral wall terminating in a longitudinally extending edge to define the lid opening, the thickness of the sheet material corresponding generally to the thickness of the receiving slot; and
securing the peripheral wall to the edge support with the receiving slot receiving the longitudinally extending edge of the peripheral wall and with the wall support contacting the inside of the peripheral wall along the longitudinally extending edge and supporting the peripheral wall.

12. The method of claim 11, wherein the step of unitarily and integrally forming an edge support is done by extrusion.

13. The method of claim 12, wherein the edge support is formed of aluminum.

14. An edge support for being secured to and supporting a peripheral wall of a bulk body formed of sheet material and terminating in a longitudinally extending edge to define a lid opening, the edge support comprising:
a wall support;
a rim extending from the wall support, the rim having a width;
a receiving slot running longitudinally and defined on one side the wall support and on an opposing side the rim, the receiving slot having a thickness extending from the rim to the wall support, the receiving slot having a depth measured transverse to the thickness, which is less than the width of the rim, the receiving slot for receiving the longitudinally extending edge of the peripheral wall;
wherein the edge support is unitarily and integrally formed of a single piece.

* * * * *

UNITED STATES PATENT AND TRADEMARK OFFICE
CERTIFICATE OF CORRECTION

PATENT NO. : 6,053,552
DATED : APRIL 25, 2000
INVENTOR(S) : GREGORY JAMES KRULL

It is certified that error appears in the above-identified patent and that said Letters Patent is hereby corrected as shown below:

Col. 4, line 51, before "edge support", insert -- an --

Signed and Sealed this

Tenth Day of April, 2001

Attest:

NICHOLAS P. GODICI

Attesting Officer     Acting Director of the United States Patent and Trademark Office